United States Patent
Yabu et al.

(10) Patent No.: US 8,354,459 B2
(45) Date of Patent: Jan. 15, 2013

(54) METHOD FOR PRODUCING POLYMER MATERIAL

(75) Inventors: Hiroshi Yabu, Miyagi (JP); Takeshi Higuchi, Fukuoka (JP)

(73) Assignee: Japan Science and Technology Agency, Saitama (JP)

(*) Notice: Subject to any disclaimer, the term of this patent is extended or adjusted under 35 U.S.C. 154(b) by 0 days.

(21) Appl. No.: 13/390,636

(22) PCT Filed: Aug. 17, 2010

(86) PCT No.: PCT/JP2010/063869
§ 371 (c)(1),
(2), (4) Date: May 24, 2012

(87) PCT Pub. No.: WO2011/021625
PCT Pub. Date: Feb. 24, 2011

(65) Prior Publication Data
US 2012/0225970 A1    Sep. 6, 2012

(30) Foreign Application Priority Data
Aug. 18, 2009 (JP) .................................. 2009-188892

(51) Int. Cl.
*C08F 2/42* (2006.01)
*C08J 3/28* (2006.01)
*B60C 11/00* (2006.01)
*C08G 63/91* (2006.01)

(52) U.S. Cl. ........ 522/149; 522/150; 522/151; 522/152; 522/153; 522/154; 522/109; 522/110; 522/111; 522/112; 522/84; 522/71; 522/74; 522/155; 522/156; 522/157; 522/158; 522/159; 522/160; 522/161; 522/162; 522/163; 522/164; 522/165; 522/166; 524/50; 524/526; 524/458; 524/459; 524/460; 524/461

(58) Field of Classification Search .................. 522/149, 522/109, 110, 111, 112, 84, 74, 71, 150, 522/151, 152, 153, 154, 155, 156, 157, 158, 522/159, 160, 161, 162, 163–166; 524/50, 524/526, 458–461
See application file for complete search history.

(56) References Cited

U.S. PATENT DOCUMENTS
7,189,435 B2    3/2007    Tuominen et al.
(Continued)

FOREIGN PATENT DOCUMENTS
JP    5-298666    11/1993
(Continued)

OTHER PUBLICATIONS

Xu et al. The effect of pressure on the microphase separation of diblock copolymer melts studies by the dynamic density functional theory based on equation of state. Macromolecular Theory and Simulations (2007), 16(3), 262-268.*

(Continued)

*Primary Examiner* — Sanza McClendon
(74) *Attorney, Agent, or Firm* — Greenblum & Bernstein, P.L.C.

(57) ABSTRACT

An object of the present invention is to provide a method for producing a block copolymer solid in which microphase-separated structures are formed with good productivity. The present invention provides a method for producing a block copolymer solid in which a microphase-separated structure is formed, or an alloy, blend or composite solid containing a block copolymer in which a microphase-separated structure is formed, which comprises the following steps (1) to (3):
(1) immersing a block copolymer solid or an alloy, blend or composite solid containing a block copolymer in a solvent in which each component is insoluble;
(2) putting the solid obtained in (1) above in a pressure-resistant container; and
(3) irradiating the solid or the solvent in (2) above with microwave.

12 Claims, 5 Drawing Sheets

U.S. PATENT DOCUMENTS

| | | | |
|---|---|---|---|
| 8,143,343 B2 * | 3/2012 | Okamoto et al. | 524/526 |
| 2007/0200477 A1 | 8/2007 | Tuominen et al. | |
| 2010/0103414 A1 | 4/2010 | Okamoto et al. | |
| 2012/0041150 A1 | 2/2012 | Yabu et al. | |

FOREIGN PATENT DOCUMENTS

| | | |
|---|---|---|
| JP | 2002-294086 | 10/2002 |
| JP | 2004-527905 | 9/2004 |
| JP | 2008-131029 | 6/2008 |
| WO | 02/073699 A2 | 9/2002 |
| WO | 2008/047514 A1 | 4/2008 |

OTHER PUBLICATIONS

Cho et al. Analysis of phase separation in compression polymer blends and block copolymers. Macromolecules, 2000, 33, 2228-2241.*

International Search Report for PCT/JP2010/063869, mailed Nov. 30, 2010, along with an English language translation thereof.

International Preliminary Report on Patentability for PCT/JP2010/063869, mailed Mar. 1, 2012, along with an English language translation thereof.

Park et al., "Morphological Reconstruction and Ordering in Films of Sphere-Forming Block Copolymers on Striped Chemically Patterned Surfaces" *Macromolecules*, vol. 41, pp. 9124-9129, 2008.

Cavicchi et al., "Solvent Annealing Thin Films of Poly(Isoprene-*b*-lactide)" *Polymer* vol. 46, No. 25, pp. 11635-11639, 2005.

Polymer ABC Handbook, Edited by Research Group on Polymer ABC, The Society of Polymer Science, Japan, NTS Inc., pp. 4-5.

Yabu et al., "Unique Phase-Separation Structures of Block-Copolymer Nanoparticles" *Advanced Materials*, vol. 17, No. 17, pp. 2062-2065, 2005.

* cited by examiner

Fugure 3B

METHOD FOR PRODUCING POLYMER MATERIAL

TECHNICAL FIELD

The present invention relates to a method for producing a block copolymer solid in which microphase-separated structures are formed, or an alloy, blend or composite solid containing block copolymers in which microphase-separated structures are formed.

BACKGROUND ART

Block copolymers comprising 2 or more types of polymer segment are known to form microphase-separated structures with a molecular length of about several nm to several hundreds of nm, when the affinity between segments is low. Microphase-separated structures generally vary depending on the copolymerization ratio of one segment to the other segment. Diblock copolymers comprising two polymer segments form phase-separated structures such as spherical, tubular (cylinder), bicontinuous (gyroid), or layered (lamellar) structures, with the increase of the proportion accounted for by either one of the two segments. When the proportion accounted for by a segment exceeds one half thereof, reverse phase structures are formed.

Various applications of such microphase-separated structures have been examined regarding nanoscale templates. For example, cylindrical structures are formed and a cylinder is filled with a magnetic recording medium, so that a nanoscale patterned magnetic recording medium can be prepared (Patent Document 1). Moreover, microphase-separated structures have been applied to various industrial fields, such as a nanowire template (Patent Document 2), a highly efficient light emitting device (Patent Document 3), and mirror for laser oscillation (Non-Patent Document 3).

The formation of uniform and stable phase-separated structures is important for these applications. A block copolymer solid is generally produced by a solution-cast method or the like, but no clear phase-separated structure is formed by the method alone. This is because entangled polymers are frozen upon solid formation. Therefore, a technique is employed for the development of various applications, which comprises heating once to the glass transition point (Tg) or higher, gradually cooling, and thus forming clear and uniform phase-separated structures (Non-Patent Document 1). This technique is employed for increasing the motility of macromolecular chains so as to further increase the interaction between polymer chains. However, this technique requires to maintain a block copolymer solid for several days to several weeks while heating it at Tg or higher, resulting in very low productivity and a barrier against practical application. This is because macromolecular chains generally require a long relaxation time, taking a long time for structural transition.

Meanwhile, Russell et al. have reported that a film with high uniformity can be obtained by exposing a block copolymer solid to solvent vapor having affinity for one or both segments of each block copolymer (Non-patent document 2). However, this technique is also problematic in that it takes much time, such as about several days, and the technique can be applied to only a thin film with a thickness that allows a solvent to permeate it.

Similar problems are present for also alloys, blends and composites for which block copolymers are used. The terms alloys, blends and composites refer to those prepared by mixing compatible polymers, those prepared by mixing incompatible polymers, and those prepared by combining at least one type of polymer with a heterologous material, respectively (Non-Patent Document 3).

[Prior Art Documents]
[Patent Documents]
[Patent Document 1] Yoshiyuki Nagataki, Shoji Nishihara, Ichiji Miyata, Kenji Kono, "Magnetic Recording Medium," JP Patent Publication (Kokai) No. 5-298666 A (1993)
[Patent Document 2] Tuominen Mark, Russell Thomas P, Ursache Andrei, and Bal Mustafa, "Nanofabrication," JP Patent Publication (Kohyo) No. 2004-527905 A
[Patent Document 3] Fong Hon Hang, Kiyotaka Mori, George G Malliaras, Yu Jye Foo, "Electroluminescent Device Designed So As To Have Mobility," JP Patent Publication (Kokai) No. 2008-131029 A
[Non-Patent Documents]
[Non-Patent Document 1] Sang-Min Park, Gordon S. W. Craig, Young-Hye La, and Paul F. Nealey, Macromolecules, 2008, 41, 9124-9129
[Non-Patent Document 2] Kevin A. Cavicchi, Keith J. Berthiaume, Thomas P. Russell, Polymer 46, 2005, 11635-11639
[Non-Patent Document 3] "Polymer ABC Handbook" Edited by Research Group on Polymer ABC, The Society of Polymer Science, Japan, NTS Inc.

SUMMARY OF THE INVENTION

Object to be Solved by the Invention

A method for rapidly forming uniform and clear microphase-separated structures from a block copolymer solid having no phase-separated structures formed therein or having poorly developed phase-separated structures or alloys, blends, or composites containing such block copolymers has been required. An object to be solved by the present invention is to provide a method for producing a block copolymer solid in which microphase-separated structures are formed with good productivity.

As a result of intensive studies directed towards achieving the aforementioned object, the present inventors have found that phase-separated structures can be rapidly obtained by immersing a block copolymer solid or an alloy, blend or composite solid containing block copolymer in a solvent in which each component is insoluble, in a pressure-resistant container, and then irradiating the resultant with microwaves so as to heat and pressurize it. Thus, they have completed the present invention.

Thus, the present invention provides a method for producing a block copolymer solid in which a microphase-separated structure is formed, or an alloy, blend or composite solid containing a block copolymer in which a microphase-separated structure is formed, which comprises the following steps (1) to (3):

(1) immersing a block copolymer solid or an alloy, blend or composite solid containing a block copolymer in a solvent in which each component is insoluble;
(2) putting the solid obtained in (1) above in a pressure-resistant container; and
(3) irradiating the solid or the solvent in (2) above with microwave.

Preferably, the block copolymer solid or the alloy, blend, or composite solid containing the block copolymer is film-shaped, in the form of fine particles, or fiber-shaped.

Preferably, the alloy comprises 2 or more types of block copolymer.

Preferably, the alloy comprises a block copolymer and a homopolymer.

Preferably, the blend comprises 2 or more types of block copolymer.

Preferably, the blend comprises a block copolymer and a homopolymer.

Preferably, the composite comprises a block copolymer and an inorganic particle.

Preferably, the composite comprises a block copolymer and an organic particle.

Preferably, the solvent is a mixture of 2 or more types of solvent.

Preferably, at least water is used as the solvent.

Preferably, the microwave wavelength ranges from 2 GHz to 4 GHz.

Preferably, the size of the inorganic particles to be used is 0.1 nm or more and 100 nm or less.

Effect of the Invention

According to the present invention, the time required for the formation of phase separation in a block copolymer can be shortened to within 1 hour, although the formation of phase separation generally requires several days to several weeks with a conventional method.

EMBODIMENTS FOR CARRYING OUT THE INVENTION

The present invention is described in detail as follows.

In the present invention, a block copolymer solid is immersed in a solvent in which the block copolymers are insoluble, the resultant is put in a pressure-resistant container, and then irradiation is performed with microwaves that correspond to the absorption characteristics of the solvent or the block copolymers, so that efficient heating and pressurization is carried out. Thus, a block copolymer solid in which microphase-separated structures are rapidly formed can be obtained. Also, an alloy, blend or composite solid containing block copolymers may be used herein instead of a block copolymer solid.

Types of block copolymers to be used in the present invention are not particularly limited. Any block copolymer(s) can be used, as long as it can form a microphase-separated structure. The term "block copolymer(s)" refers to a copolymer(s) having a plurality of independent polymer chains as partial components (blocks). Typical examples of block copolymers include linear polymers such as A-B type diblock copolymers having an $-(A)_m-(B)_n-$ structure in which an A polymer chain having repeating unit A and a B polymer chain having repeating unit B are chemically bound at their ends. Further-more, block copolymers in which 3 or more types of polymer chain are bound may also be used herein. In the case of tri-block copolymers, the structure may be that of the A-B-A type, B-A-B type, or A-B-C type.

Specific examples of block copolymers to be used in the present invention include aromatic hydrocarbon-aliphatic hydrocarbon block copolymers such as a styrene-butadiene block copolymer and a styrene-isoprene block copolymer, aromatic hydrocarbon-aliphatic polar compound block copolymers such as a styrene-acrylic acid block copolymer, a styrene-sodium acrylate block copolymer, a styrene-polyethylene glycol block copolymer, and a fluorene-methyl methacrylate block copolymer, and aromatic hydrocarbon-aromatic polar compound block copolymers such as styrene-vinylpyridine.

In the present invention, not only a block copolymer solid, but also an alloy, blend or composite solid containing block copolymers can be used. An alloy may be an alloy prepared by mixing compatible polymers. The alloy may comprise 2 or more types of block copolymer, or the alloy may comprise a block copolymer and a homopolymer. A blend is prepared by mixing incompatible polymers. The blend may comprise 2 or more types of block copolymer, or the blend may comprise a block copolymer and a homopolymer. The types of homopolymer to be used when an alloy or a blend is used are not particularly limited. Any homopolymer can be used. The homopolymer may be prepared by using the same monomer as the monomer which composes a block copolymer or by using a monomer which is different from the monomer which composes a block copolymer.

Also, a composite is prepared by combining at least 1 type of polymer with a heterologous material. The composite may comprise a block copolymer and an inorganic particle, or the composite may comprise a block copolymer and an organic particle. As inorganic particles, metal particles such as gold, silver, platinum, palladium and cobalt, inorganic oxide particles such as silicon oxide, titanium oxide and zinc oxide, and compound semiconductor particles such as cadmium sulfide, cadmium telluride and cadmium selenide can be used. Further, these inorganic particles may be used alone, or the surfaces of these inorganic particles may be coated with organic substance. Furthermore, as organic particles, crosslinking polymer fine particles such as polymerized polystyrene fine particles, organic dye particles such as cyanine dye particles, and carbon particles such as carbon black, fullerene and carbon nanotube can be used, for example. Preferably, the size of inorganic particles to be used herein ranges from 0.1 nm or more to 100 nm or less.

The shape of a block copolymer solid or an alloy, blend or composite solid containing block copolymers is not particularly limited. For example, a block copolymer solid or an alloy, blend or composite solid containing block copolymers can be film-shaped, in the form of fine particles, or fiber-shaped. A method for shaping a block copolymer solid or the like into a film, fine particle or fiber form is not particularly limited, and a block copolymer solid or the like can be shaped by any method known by persons skilled in the art. For example, fine particles can be prepared by a self-organized precipitation (SORP) method (Hiroshi Yabu, Takeshi Higuchi, Masatsugu Shimomura, Advanced Materials, 2005, 2602-2605).

In the present invention, a block copolymer solid or an alloy, blend or composite solid containing block copolymers is immersed in a solvent in which each component is insoluble. Specific examples of a solvent include, in addition to water as the most general example, aliphatic hydrocarbons such as n-hexane and n-heptane, alcohols such as butyl alcohol and propyl alcohol, highly polar organic solvents such as dimethylformamide and dimethyl sulfoxide, and acids such as acetic acid. A solvent in which each solid component is insoluble can be selected from these examples, and can be used. A solvent to be used herein may be 1 type of solvent or a mixture of 2 or more types of solvent. As a solvent, water is preferably used, for example.

In the present invention, a solid immersed in a solvent is put in a pressure-resistant container, and is then irradiated with microwaves. The types of pressure-resistant container to be used in the present invention are not particularly limited, and any container can be used as long as a solid immersed in a solvent can be placed therein and irradiation of a solid with microwaves is possible. For example, a Teflon pressure-resistant container can be used.

The term "microwaves" refers to electromagnetic waves with a frequency of 300 megahertz to 3 terahertz, and they are generally electromagnetic waves with a wavelength of 100 μm to 1 m. When a substance is irradiated with microwaves, heat can be generated from the inside of the substance due to interaction between microwaves and the substance. During microwave heating, an object itself becomes a heat generator, so that both internal and external temperatures increase in a similar manner. As an apparatus using such microwave heating, a microwave oven (the microwave frequency employed for microwave ovens in Japan is generally 2,450 MHz) is commonly used. Microwave irradiation for the present invention can also be performed using a commonly used microwave oven, for example. The time for microwave irradiation is not particularly limited. Microwave irradiation may be performed for time period sufficient for the formation of desired microphase-separated structures. The time for microwave irradiation ranges from 30 seconds to 30 minutes, preferably ranges from 30 seconds to 10 minutes, and further preferably ranges from 30 seconds to 5 minutes, for example. Preferably, the microwave wavelength ranges from 2 GHz to 4 GHz.

Hereafter, the present invention is described in greater detail with reference to the following examples, although the present invention is not limited to these examples.

EXAMPLES

Example 1

Figure 1:
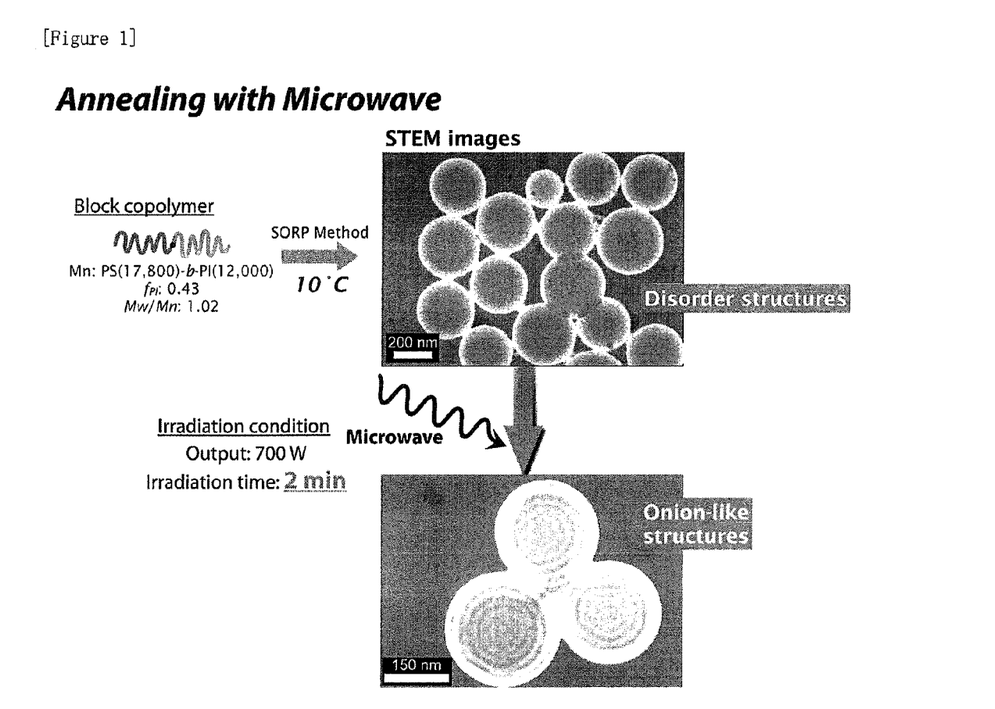
FIG. 1 shows a result of a production example (present invention) of a block copolymer solid in which microphase-separated structures are formed by microwave irradiation.

Poly(styrene-block-isoprene) (hereinafter, PS-b-PI; Molecular weight PS: 17,800; PI: 12,000; Polymer Source) was dissolved in tetrahydrofuran (THF). Water was added to the THF solution during stirring until THF water =1:2 is achieved, and then stirring was stopped. A thermostat bath was set at 10° C., THF was evaporated in the thermostat bath, and thus PS-b-PI fine particles were obtained (self-organized precipitation (SORP) method) (see Hiroshi Yabu, Takeshi Higuchi, Masatsugu Shimomura, Advanced Materials, 2005, 2602-2605). A PI site was stained with osmium tetroxide, immobilized, and then observed with a scanning transmission electron microscope (STEM). Clear phase-separated structure was not formed (disorder phase) (FIG. 1).

The aforementioned solution was put in a Teflon pressure-resistant container, and the solution was heated for 2 minutes in a 700 W microwave oven, stained with osmium tetroxide, and then observed with STEM. As a result, clear concentric spherical structures were observed (FIG. 1). It was demonstrated by this result that microwave heating has the effect of accelerating the rapid formation of phase-separated structures.

Reference Example 1

Figure 2:
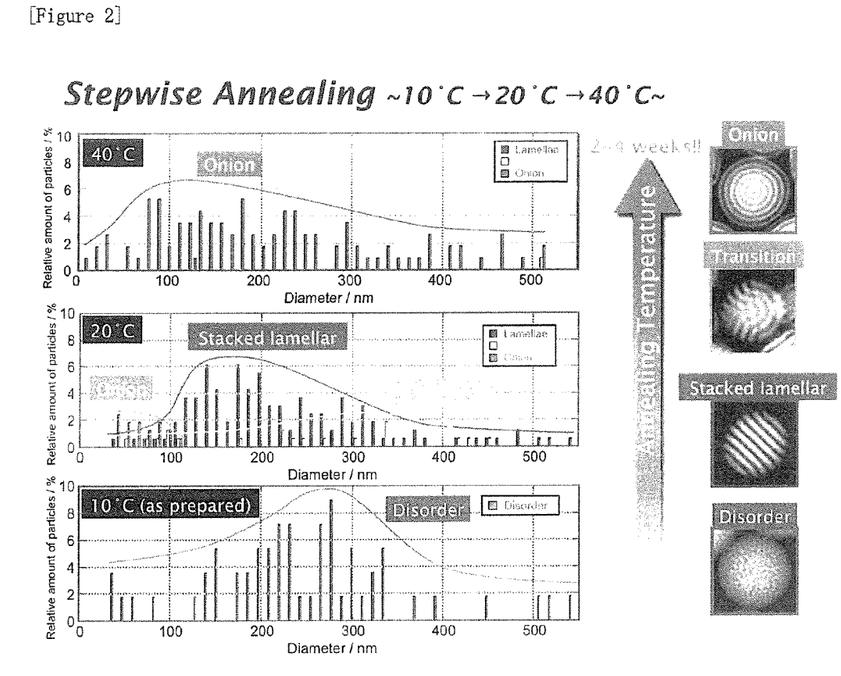
FIG. 2 shows a result of a production example (reference example) of a block copolymer solid in which concentric spherical structures are formed by annealing treatment under normal temperature and normal pressure.

The same PS-b-PI as in Example 1 was heated under normal temperature and normal pressure and then the way in which phase-separated structures were altered was observed. PS-b-PI having a disorder phase was prepared by the SORP method similarly to Example 1. The solution was placed in a thermostat bath at 10° C. Temperature was increased to 20° C. and then to 40° C. for 2 to 4 weeks. Gradual transition to concentric spherical structures was observed (FIG. 2). This result suggested that annealing treatment under normal temperature and normal pressure requires several weeks for concentric spherical structures to be obtained.

Example 2

Copolymerization Ratio

Fine particles were prepared by techniques similar to the method of Example 1 from a styrene-isoprene block copolymer (PS-b-PI-2, Mn: PS (40,800)-b-PI(10,400)) in which proportion of polyisoprene accounted for 22%. Specifically, a THF solution of the block copolymer was prepared, 1 mL of water was added to 2 mL of the solution, THF was evaporated, and thus an aqueous dispersion of PS-b-PI-2 fine particles was obtained.

Figure 3A:
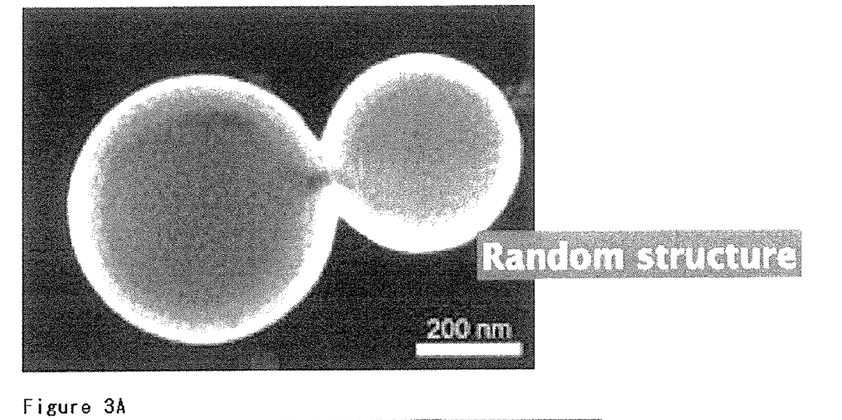
FIG. 3 shows a result of a production example of block copolymers in which microphase-separated structures are formed by microwave irradiation using block copolymer fine particles with different copolymerization ratios.

An aqueous 0.2% osmium tetroxide solution was added to the dispersion and then washing was performed with MilliQ water, followed by recovery by centrifugation. The procedure was repeated. After staining and washing of fine particles, the internal structure of the thus prepared fine particles was observed with TEM. However, clear periodic structure was not observed (FIG. 3A).

The aqueous dispersion of PS-b-PI-2 fine particles was put in a Teflon pressure-resistant container, and then the aqueous dispersion was irradiated with microwaves at 700 W for 2 minutes. The resultant was cooled to room temperature, fine particles were stained and washed in a manner similar to the above-described technique, and then they were observed with TEM. A clear cylindrical phase was formed in the inside of it (FIG. 3B).

As understood from the above results, phase-separated structures were rapidly formed by microwave irradiation even in fine particles of a block copolymer with a copolymerization ratio which is different from that of the previous block copolymer.

Example 3

Composite with Inorganic Nanoparticles

Gold nanoparticles (Au(a)PS-SH) protected with thiol-terminated polystyrene (Mn=1,000) were synthesized according to a literature. A block copolymer (PS-b-PI-3, Mn:PS (16,100)-b-PI(11,200)) of polystyrene and polyisoprene and Au(a)PS-SH were mixed at a weight ratio of 7:3. The mixture was dissolved in THF, water was added, THF was evaporated, and thus composite fine particles were obtained.

Figure 4A:
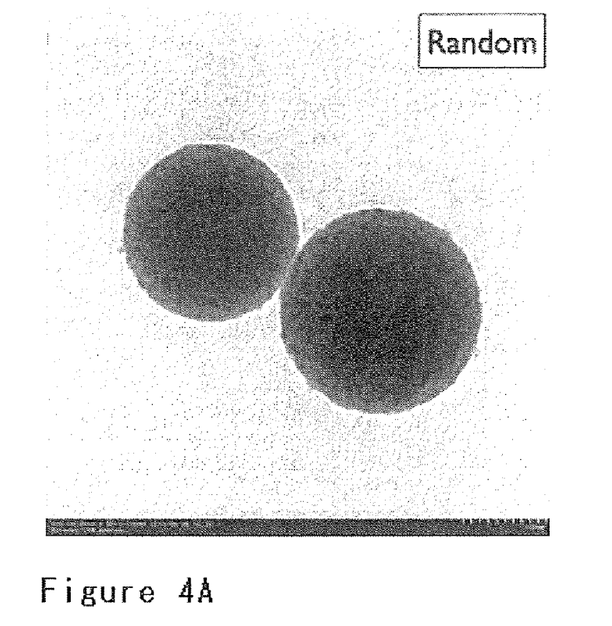
FIG. 4 shows a result of the formation of phase-separated structures by microwave irradiation using composites with inorganic nanoparticles.

After staining and washing with the technique described in Examples 1 and 2, internal structures were observed with TEM. However, clear phase-separated structure was not observed (FIG. 4A).

Figure 4B:
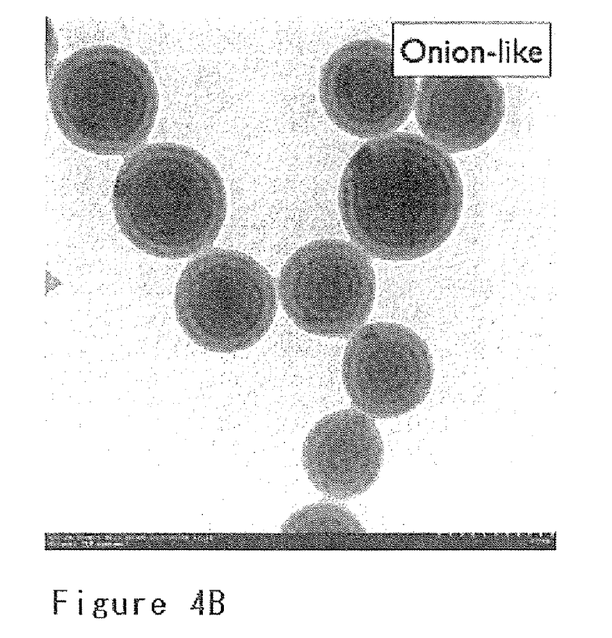

A dispersion of the fine particles was put in a Teflon pressure-resistant container, and the dispersion was irradiated with microwaves at 170 W for 4 minutes, cooled to room temperature, stained and washed, and then observed with TEM. As a result, clear onion-like phase-separated structures were formed (FIG. 4B). Furthermore, it was observed that Au(a)PS-SH was introduced specifically into a polystyrene phase.

As understood from the above result, phase-separated structures were rapidly formed by microwave irradiation also in the composite formed with inorganic nanoparticles.

Example 4

Film

Figure 5A:
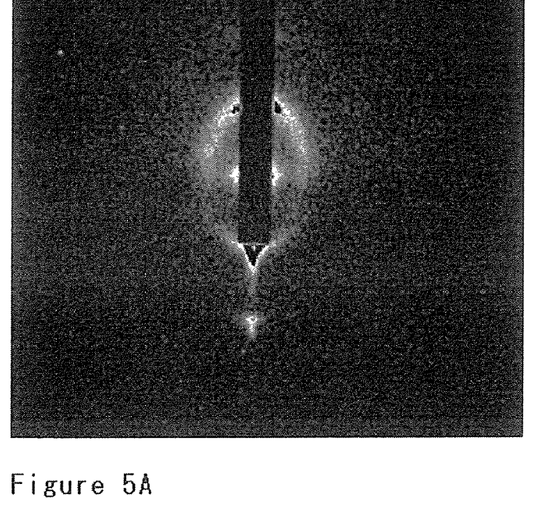
FIG. 5 shows a result of grazing incidence small-angle X-ray diffraction measurement for a film before and after microwave irradiation.
Figure 5B:
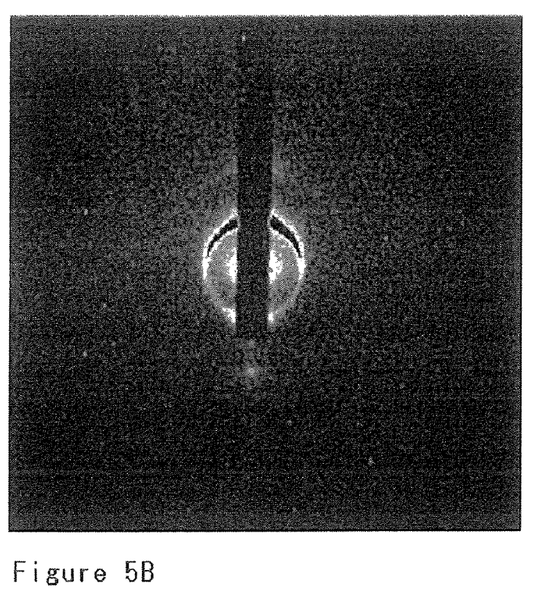

A cyclohexane solution of a block copolymer (PS-b-PI-4,) of polystyrene and polyisoprene was spin cast on a silicon substrate, so that a thin film was obtained. The thin film and water were put in a Teflon pressure-resistant container, and was irradiated with microwaves at 700 W for 2 minutes, Grazing incidence small-angle X-ray diffraction measurement was performed for the film before microwave irradiation and the film after microwave irradiation. Blurred diffraction was observed for the film before microwave irradiation, suggesting the presence of a lamellar structure parallel to the substrate (FIG. 5A). On the other hand, clear diffraction was observed for the film after microwave irradiation, suggesting the presence of components vertical to the substrate and components parallel to the substrate (FIG. 5B).

The periodicity of phase-separated structures depends on diffraction spot size. Smaller and clearer spot width indicates high periodicity. It was thus demonstrated that phase-separated structures were more clearly formed with microwave irradiation.

The invention claimed is:

1. A method for producing a block copolymer solid in which a microphase-separated structure is formed, or an alloy, blend or composite solid containing a block copolymer in which a microphase-separated structure is formed, which comprises the following (1) to (3):

(1) immersing a block copolymer solid or an alloy, blend or composite solid containing a block copolymer in a solvent in which each component is insoluble;
(2) putting the solid obtained in (1) above in a pressure-resistant container; and
(3) irradiating the solid or the solvent in (2) above with microwave.

2. The method according to claim 1, wherein the block copolymer solid or the alloy, blend, or composite solid containing the block copolymer is film-shaped, in the form of fine particles, or fiber-shaped.

3. The method according to claim 1, wherein the alloy comprises 2 or more types of block copolymer.

4. The method according to claim 1, wherein the alloy comprises a block copolymer and a homopolymer.

5. The method according to claim 1, wherein the blend comprises 2 or more types of block copolymer.

6. The method according to claim 1, wherein the blend comprises a block copolymer and a homopolymer.

7. The method according to claim 1, wherein the composite comprises a block copolymer and an inorganic particle.

8. The method according to claim 1, wherein the composite comprises a block copolymer and an organic particle.

9. The method according to claim 1, wherein the solvent is a mixture of 2 or more types of solvent.

10. The method according to claim 1, wherein at least water is used as the solvent.

11. The method according to claim 1, wherein the microwave wavelength ranges from 2 GHz to 4 GHz.

12. The method according to claim 7, wherein the size of the inorganic particles to be used is 0.1 nm or more and 100 nm or less.

* * * * *